United States Patent
Hersey et al.

(10) Patent No.: US 8,110,099 B2
(45) Date of Patent: Feb. 7, 2012

(54) STORMWATER FILTER ASSEMBLY

(75) Inventors: Christopher S. Hersey, South Portland, ME (US); Daniel P. Cobb, Portland, ME (US); Matthew L. Stiller, Vancouver, WA (US); Gregory W. Byrne, Jr., Tualatin, OR (US); Christopher W. Weiler, Goffstown, NH (US); Daniel W. Aberle, Portland, OR (US); Gregory Kowalsky, Portland, OR (US); Michael Stone, Falmouth, ME (US)

(73) Assignee: Contech Stormwater Solutions Inc., West Chester, OH (US)

( * ) Notice: Subject to any disclaimer, the term of this patent is extended or adjusted under 35 U.S.C. 154(b) by 1199 days.

(21) Appl. No.: 11/746,249

(22) Filed: May 9, 2007

(65) Prior Publication Data

US 2008/0277327 A1   Nov. 13, 2008

(51) Int. Cl.
*B01D 35/30* (2006.01)
*C02F 1/00* (2006.01)
*B01D 35/00* (2006.01)

(52) U.S. Cl. .................. 210/170.03; 210/457; 210/437; 210/442; 210/232; 210/121

(58) Field of Classification Search .................. None
See application file for complete search history.

(56) References Cited

U.S. PATENT DOCUMENTS

| | | | |
|---|---|---|---|
| 2,849,070 A | 4/1956 | Maly | |
| 2,945,541 A | 7/1960 | Maly et al. | |
| 3,385,367 A | 5/1968 | Kollsman | |
| 4,838,901 A | 6/1989 | Schmidt et al. | |
| 5,193,709 A | 3/1993 | Brassell | |
| 5,223,154 A | 6/1993 | MacPherson, Jr. et al. | |
| 5,248,415 A | 9/1993 | Masuda et al. | |
| 5,296,293 A | 3/1994 | Jobst | |
| 5,297,367 A | 3/1994 | Sainz | |
| 5,316,589 A | 5/1994 | Krieger, Jr. | |
| 5,322,629 A | 6/1994 | Stewart | |
| 5,419,838 A | 5/1995 | DiTullio | |

(Continued)

FOREIGN PATENT DOCUMENTS

GB   2396635   6/2004

(Continued)

OTHER PUBLICATIONS

International Search Report and Written Opinion, PCT/US2008/061703 (May 20, 2009).

*Primary Examiner* — Nam Nguyen
*Assistant Examiner* — Madeline Gonzalez
(74) *Attorney, Agent, or Firm* — Thompson Hine LLP

(57) ABSTRACT

A filter assembly for use in filtering stormwater includes a bottom including a boss that includes a rib extending laterally along an inner surface of the boss. The rib includes a locking portion that mates with a corresponding locking portion on a peripheral surface of a connection to an outlet conduit for securing the bottom to the connection thereby inhibiting rotation of the bottom relative to the outlet conduit. A center tube is secured to the bottom using a locking mechanism that inhibits relative movement between the bottom and the center tube. The center tube is in communication with an opening in the bottom and a hood is secured to the center tube. A filter medium is located between the hood and the center tube.

25 Claims, 15 Drawing Sheets

U.S. PATENT DOCUMENTS

| | | | |
|---|---|---|---|
| 5,433,845 A | 7/1995 | Greene et al. | |
| 5,458,769 A | 10/1995 | Johnnessen | |
| 5,511,904 A | 4/1996 | Van Egmond | |
| 5,549,817 A | 8/1996 | Horsley et al. | |
| 5,556,542 A * | 9/1996 | Berman et al. | 210/232 |
| 5,562,819 A | 10/1996 | Turner, Jr. et al. | |
| 5,573,349 A | 11/1996 | Paoluccio | |
| 5,624,552 A | 4/1997 | Vales et al. | |
| 5,624,576 A | 4/1997 | Lenhart et al. | |
| 5,632,889 A | 5/1997 | Tharp | |
| 5,683,577 A | 11/1997 | Nurse, Jr. | |
| 5,707,431 A | 1/1998 | Verkaart et al. | |
| 5,744,048 A * | 4/1998 | Stetler | 210/803 |
| 5,746,911 A | 5/1998 | Pank | |
| 5,770,057 A | 6/1998 | Filion | |
| 5,770,080 A | 6/1998 | Malone | |
| 5,779,888 A | 7/1998 | Bennett | |
| 5,788,848 A | 8/1998 | Blanche et al. | |
| 5,807,481 A * | 9/1998 | Hodgkins et al. | 210/130 |
| 5,820,762 A | 10/1998 | Bamer et al. | |
| 5,871,643 A * | 2/1999 | Ota | 210/238 |
| 5,954,952 A | 9/1999 | Strawser, Sr. | |
| 5,979,669 A | 11/1999 | Kitajima et al. | |
| 5,996,811 A | 12/1999 | Kitajima et al. | |
| 6,042,743 A | 3/2000 | Clemenson | |
| 6,045,699 A | 4/2000 | Yazawa et al. | |
| 6,059,964 A | 5/2000 | Strawser, Sr. | |
| 6,077,423 A | 6/2000 | Roy et al. | |
| 6,077,448 A | 6/2000 | Tran-Quoc-Nam et al. | |
| 6,080,307 A | 6/2000 | Morris et al. | |
| 6,083,402 A | 7/2000 | Butler | |
| 6,086,756 A | 7/2000 | Roy | |
| 6,096,200 A | 8/2000 | Bennett | |
| 6,099,723 A | 8/2000 | Morris et al. | |
| 6,106,707 A | 8/2000 | Morris et al. | |
| 6,120,684 A | 9/2000 | Kistner et al. | |
| 6,139,741 A | 10/2000 | McGibbon | |
| 6,143,172 A | 11/2000 | Rink et al. | |
| 6,155,561 A | 12/2000 | Mandel | |
| 6,171,507 B1 | 1/2001 | Roy et al. | |
| 6,183,633 B1 | 2/2001 | Phillips | |
| 6,187,183 B1 | 2/2001 | Weaver et al. | |
| 6,217,757 B1 | 4/2001 | Fleischmann | |
| 6,231,758 B1 | 5/2001 | Morris et al. | |
| 6,241,881 B1 | 6/2001 | Pezzaniti et al. | |
| 6,264,835 B1 | 7/2001 | Pank | |
| 6,277,274 B1 | 8/2001 | Coffman | |
| 6,287,459 B1 | 9/2001 | Williamson | |
| 6,299,661 B1 * | 10/2001 | Bloomer | 55/385.3 |
| 6,328,167 B1 | 12/2001 | Seshimoto et al. | |
| 6,337,025 B1 | 1/2002 | Clemenson | |
| 6,338,797 B1 | 1/2002 | Nurse, Jr. et al. | |
| 6,350,374 B1 | 2/2002 | Stever et al. | |
| 6,358,405 B1 | 3/2002 | Leahy | |
| 6,379,541 B1 | 4/2002 | Nicholas | |
| 6,406,218 B1 | 6/2002 | Olson | |
| 6,464,862 B2 | 10/2002 | Bennett | |
| 6,478,954 B1 | 11/2002 | Turner, Jr. et al. | |
| 6,511,595 B2 | 1/2003 | Crompton et al. | |
| 6,517,724 B1 | 2/2003 | Malone | |
| 6,533,941 B2 | 3/2003 | Butler | |
| 6,579,448 B2 * | 6/2003 | Dworatzek | 210/130 |
| 6,605,216 B1 | 8/2003 | Lederman | |
| 6,869,528 B2 | 3/2005 | Pank | |
| 6,913,152 B2 * | 7/2005 | Zuk, Jr. | 210/406 |
| 7,005,060 B2 | 2/2006 | Pitt et al. | |
| 7,066,338 B1 * | 6/2006 | Winter et al. | 210/455 |
| 2001/0045392 A1 | 11/2001 | Gray et al. | |
| 2003/0034286 A1 | 2/2003 | Butler | |
| 2003/0089652 A1 | 5/2003 | Matsui et al. | |
| 2003/0094407 A1 | 5/2003 | de Ridder et al. | |
| 2003/0127377 A1 | 7/2003 | Pank | |
| 2003/0173092 A1 | 9/2003 | Wilson et al. | |
| 2004/0112807 A1 | 6/2004 | Aberle et al. | |
| 2005/0040113 A1 | 2/2005 | Howard | |
| 2005/0178717 A1 * | 8/2005 | Bagci et al. | 210/444 |
| 2005/0178719 A1 | 8/2005 | Pank | |
| 2005/0263451 A1 * | 12/2005 | Kramer | 210/450 |
| 2006/0272806 A1 | 12/2006 | Wilkie et al. | |

FOREIGN PATENT DOCUMENTS

| | | |
|---|---|---|
| GB | 2411918 | 9/2005 |
| WO | 2005/090741 | 9/2005 |
| WO | 2008/097312 | 8/2008 |

* cited by examiner

STORMWATER FILTER ASSEMBLY

TECHNICAL FIELD

The present application relates generally to a filter apparatus and, in particular, a stormwater filter assembly having improved installation features.

BACKGROUND

Stormwater is pure rainwater plus any particulate debris and dissolved materials that the rainwater may entrain as it traverses a surface. In urban areas, rain that falls on the roofs of buildings, collects on paved areas like driveways, roads, runways and sidewalks is typically diverted through a system of pipes, catch basins, etc. that is separate from the sewage system. Unlike sewage, stormwater historically has not been treated, but flowed directly from streets and gutters into natural bodies of water, e.g., rivers, lakes and the ocean.

Stormwater can therefore be a form of diffuse or non-point source pollution. It can entrain pollutants, such as garbage, sediment, organic matter, heavy metals, and organic toxins, and transport them into receiving natural bodies of water. As a consequence, natural bodies of water that receive stormwater may also receive the pollutants.

The amount of stormwater pollution entering into such receiving bodies of water is related to the degree of urbanization in the surrounding area and the nature of the surrounding activities. Urbanization results in the covering of land with structures of various permeabilities, such as roadways, parking lots, and rooftops, which both generate large volumes of stormwater and accumulate pollutants. Since some of these surfaces do not allow rainfall to infiltrate, they allow the accumulated pollutants to be carried into stormwater drainage systems.

In an effort to address the environmental problems posed by polluted stormwater, systems which may include traps and filters for stormwater have been developed. For example, a filter apparatus described in U.S. Pat. No. 6,027,639 features a siphon-inducing mechanism. The filter apparatus of the '639 patent utilizes a sealed upper housing that includes a check valve for air evacuation within the housing. An induced siphon effect pulls stormwater through the filter until air is pulled through an air inlet along the lower perimeter of the housing, disrupting the siphon.

SUMMARY

In an aspect, a filter assembly for use in filtering stormwater includes a bottom including a boss that includes a rib extending laterally along an inner surface of the boss. The rib includes a locking portion that mates with a corresponding locking portion on a peripheral surface of a connection to an outlet conduit for securing the bottom to the connection thereby inhibiting rotation of the bottom relative to the outlet conduit. A center tube is secured to the bottom using a locking mechanism that inhibits relative movement between the bottom and the center tube. The center tube is in communication with an opening in the bottom and a hood is secured to the center tube. A filter medium is located between the hood and the center tube.

In another aspect, a method of assembling a filter assembly for use in filtering stormwater is provided. The method includes securing a center tube to a bottom using a locking mechanism thereby inhibiting relative movement between the bottom and the center tube. The center tube is in communication with an opening in the bottom. A hood is secured to the center tube thereby inhibiting relative movement between the center tube and the hood. A filter media is provided between the hood and the center tube. A rotational force is applied to the assembly which causes the center tube and bottom to rotate during installation.

In another aspect, a stormwater treatment system for use in filtering stormwater includes an outlet conduit connection that connects to a filter conduit for use in delivering filtered stormwater toward an outlet of the stormwater treatment system. The outlet conduit connection includes a locking portion on a peripheral surface of the outlet conduit connection. A filter assembly includes a bottom including a boss that includes a rib extending laterally along an inner surface of the boss. The rib includes a locking portion that mates with the snap lock portion on the peripheral surface of the outlet conduit connection for securing the bottom to the outlet conduit connection thereby inhibiting rotation of the bottom relative to the outlet conduit connection. A center tube is secured to the bottom using a locking mechanism that inhibits relative movement between the bottom and the center tube. The center tube is in communication with an opening in the bottom and the outlet conduit connection. A hood is secured to the center tube. A filter media is between the hood and the center tube.

In another aspect a filter assembly for use in filtering stormwater includes a drainage space within the housing structure. A filter medium is between the drainage space and housing structure. The housing structure includes a lower portion with a mount opening for mating with an outlet conduit connection. The mount opening includes a pair of circumferentially extending and diametrically opposed ribs extending radially inwardly.

The details of one or more embodiments are set forth in the accompanying drawings and the description below. Other features, objects, and advantages will be apparent from the description and drawings, and from the claims.

DETAILED DESCRIPTION

The disclosed filter assembly includes a filter media with a vertically oriented filtration surface. The filter media is contained within an external housing, cover or hood with, in some embodiments, a plurality of voids located near its lower perimeter. The hood is designed to house and facilitate the filtration of stormwater through the filter media as well as to promote the development and maintenance of a siphon, which is located between a permeable outer screen and a permeable center tube. As will be described in greater detail below, the filter assembly includes several features that facilitate assembly and installation of the filter assembly, for example, within a containment structure. While the description below focuses on a horizontal and radial flow-through filter assembly having a perforated center tube, similar features could be incorporated into other filter assembly configurations including a filtration assembly where the center tube is solid and/or in which the filter element is spiraled or in which flow through the filter is primarily upward.

Figure 1:
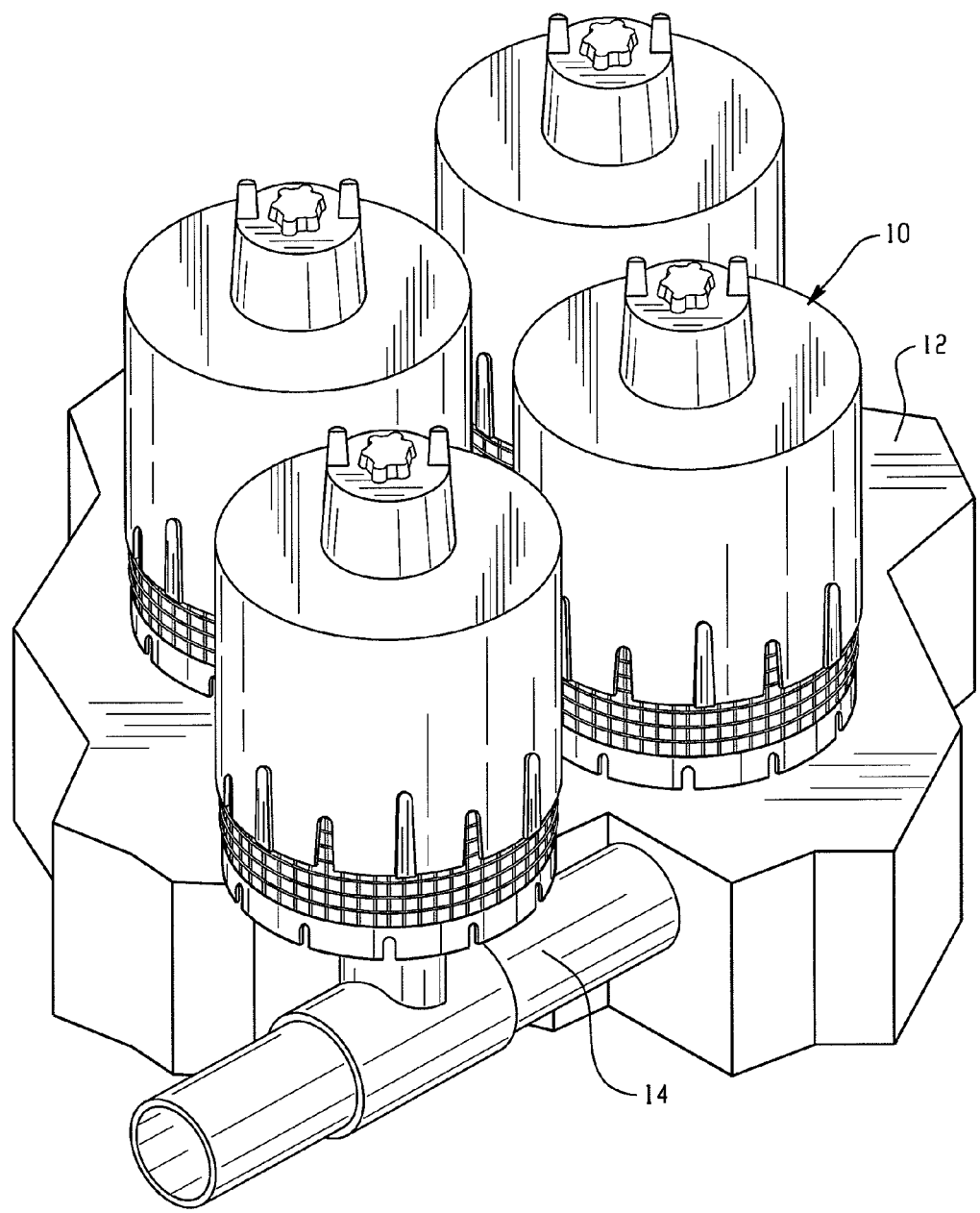
FIG. 1 is a perspective view of an embodiment of a manifold of filter assemblies.

A manifold of filter assemblies 10 is shown in FIG. 1. The filter assemblies are typically housed in a containment structure 12 (e.g., a concrete vault or other tank configuration) that is generally adapted to receive stormwater runoff from a stormwater drainage pipe, a parking lot, a street or other surface. In some embodiments, the containment structure 12 includes an initial configuration that allows for stormwater to bypass the manifold of filter assemblies 10 during the site construction phase. After this site construction phase, the containment structure is changed to a normal filtering configuration where incoming stormwater is filtered using the filter assemblies 10.

A given containment structure 12 may contain only a single filter assembly 10, but typically contains two or more filter assemblies. The filter assemblies 10 may drain filtered stormwater into a filter conduit 14 that directs the filtered stormwater toward an outlet. While the filter conduit 14 is shown as having a circular cross-section, it may have a different cross-sectional shape such as rectangular. The filtered stormwater leaving the containment structure may be released into a receiving water body or waterway or diverted to additional treatment for further purification, as examples.

Figure 2:
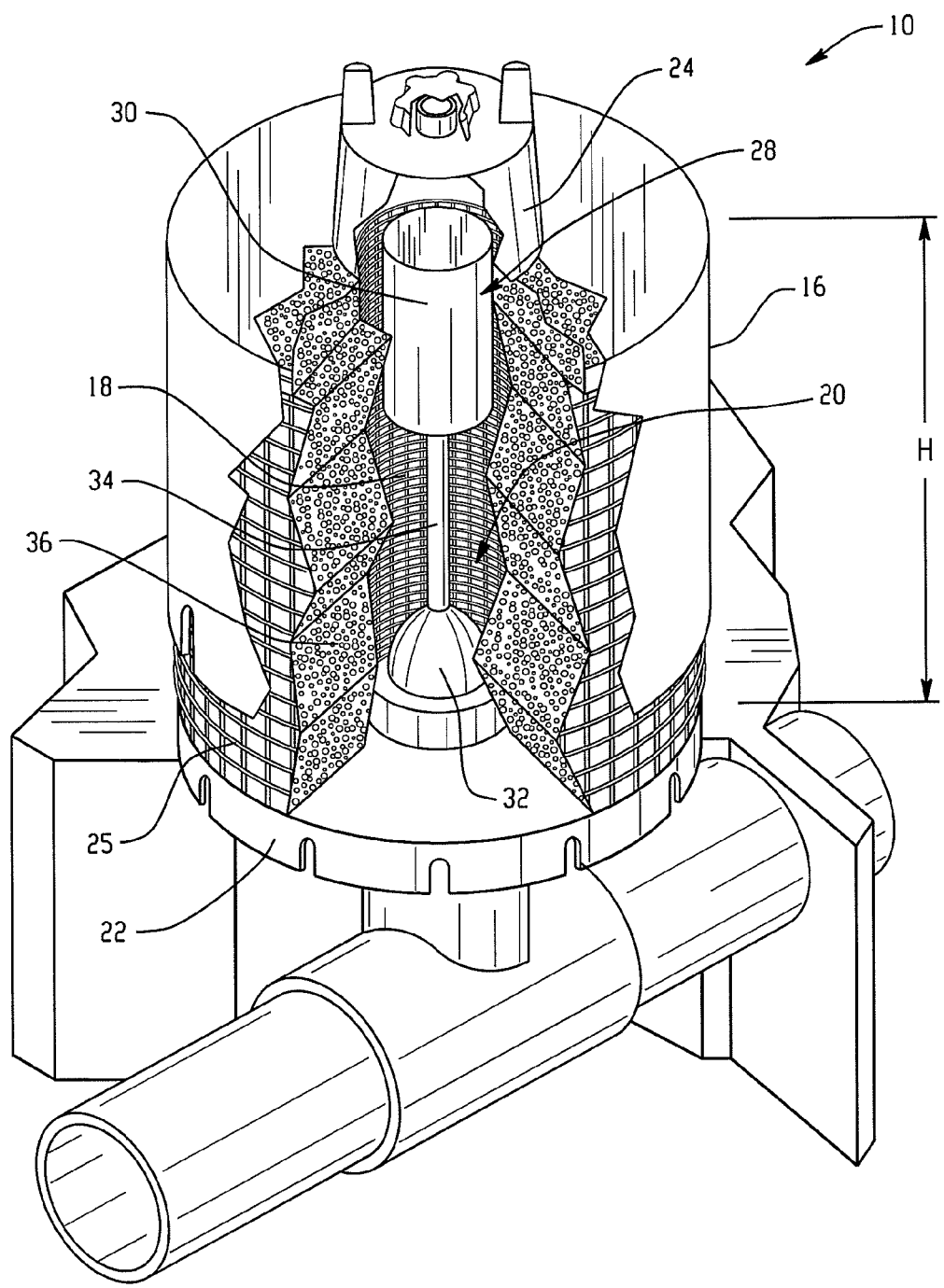
FIG. 2 is a section view of an embodiment of a filter assembly.

Referring to FIG. 2, the filter assembly 10 includes the hood 16 connected to a perforated or mesh center tube 18 having a drainage space 20 extending therethrough, with an inner drainage space cap 24 that engages an upward extending end of the center tube 18. Inner drainage space cap 24 contains a mechanism (e.g., a one-way check valve) to promote the development of a siphon by permitting air to be expelled from beneath the hood 16 without preventing air from flowing back into the filter assembly 10 through the inner drainage space cap.

Center tube 18 is connected to a bottom 22 that forms a base for the filter assembly 10. The permeable outer screen 25 rests on the bottom 22, the outer screen extending vertically upward from the bottom and defining an annular volume between the center tube 18 and the outer screen. Flow through the filter assembly is controlled by a float valve assembly 28 that includes a buoyant float 30, a float valve body 32 and a linkage 34 joining the buoyant float and the float valve body. The float valve assembly 28 impedes or limits passage of stormwater from the filter assembly 10 when it is in its lowered position as illustrated.

Filter media 36 is located within the annular volume between the center tube 18 and the outer screen 25. In some embodiments, the filter media has a height of more than about 18 inches, such as about 27 inches or more. In other embodiments, the filter media has a height of less than 18 inches, such as about 12 inches. The filter assembly 10 generally relies on hydraulic pressure to initially force water through the filter media and the filter assembly is therefore at least partially submerged in stormwater during normal operation. As stormwater enters the filter assembly, infiltrates radially inward through the outer screen 25 and filter media 36, and into the drainage space 20, filtration occurs as the stormwater is strained through and comes into contact with the filter media. General operation of the filter assembly including siphon is similar to that described in pending U.S. patent Ser. No. 10/647,102, filed Aug. 21, 2003, the details of which are hereby incorporated by reference as if fully set forth herein.

The filter media 36 is selected to efficiently remove contaminants by physical filtration. Additionally, the filter media may be selected to remove contaminants through mechanical action, chemical action, biological action, or by any suitable combination thereof. In one aspect, a screen such as outer screen 25 is a satisfactory physical filter without the presence of additional filter media. The filter assembly may be capable of high throughput, rapidly screening debris from large volumes of stormwater. Alternatively, the filter includes outer screen 25 and one or more types of filter medium that is selected for finer filtration, for appropriate chemical reactivity, or appropriate biological activity. Mixtures of different media types are optionally used to provide advantageous combinations of filtering ability.

The filter media 36 may be selected to remove heavy metals, oils and greases, organic toxins, and other contaminants that stormwater typically accumulates when flowing over paved areas in residential or industrial communities before entry into a stormwater treatment system. Alternatively, or in addition, the filter media 36 is selected to remove total or dissolved phosphorous or nitrogen from stormwater. Selected media include, without limitation, organic compost, vermiculite, activated carbon, peat, zeolite, perlite, diatomaceous earth, clay minerals, commercial ion exchange resins, catalyst-infused resins, silica sand, iron-infused media, or mixtures of these. The filter media 36 may be in the form of granules or pellets. Large granules provide the advantage of maintaining a high flow rate through the treatment bed by minimizing clogging of the bed that might otherwise arise from the accumulation of fine particulate debris. Alternatively, fine granules provide enhanced filtration of fine debris. The selection of pellet or granule size depends on the desired level of physical straining and treatment.

The filter assembly 10 optionally includes a cloth or paper filter, including pleated filters. The use of a cloth or paper filter either outside of or within the filter medium basket may be used to capture extremely fine particulates during filtration.

While the outer screen 25 is shown generally as a right circular cylinder in the illustrated embodiment, other configurations are contemplated. For example, an outer screen with an undulating, wavelike shape could be used to increase the filter surface area.

Figure 3:
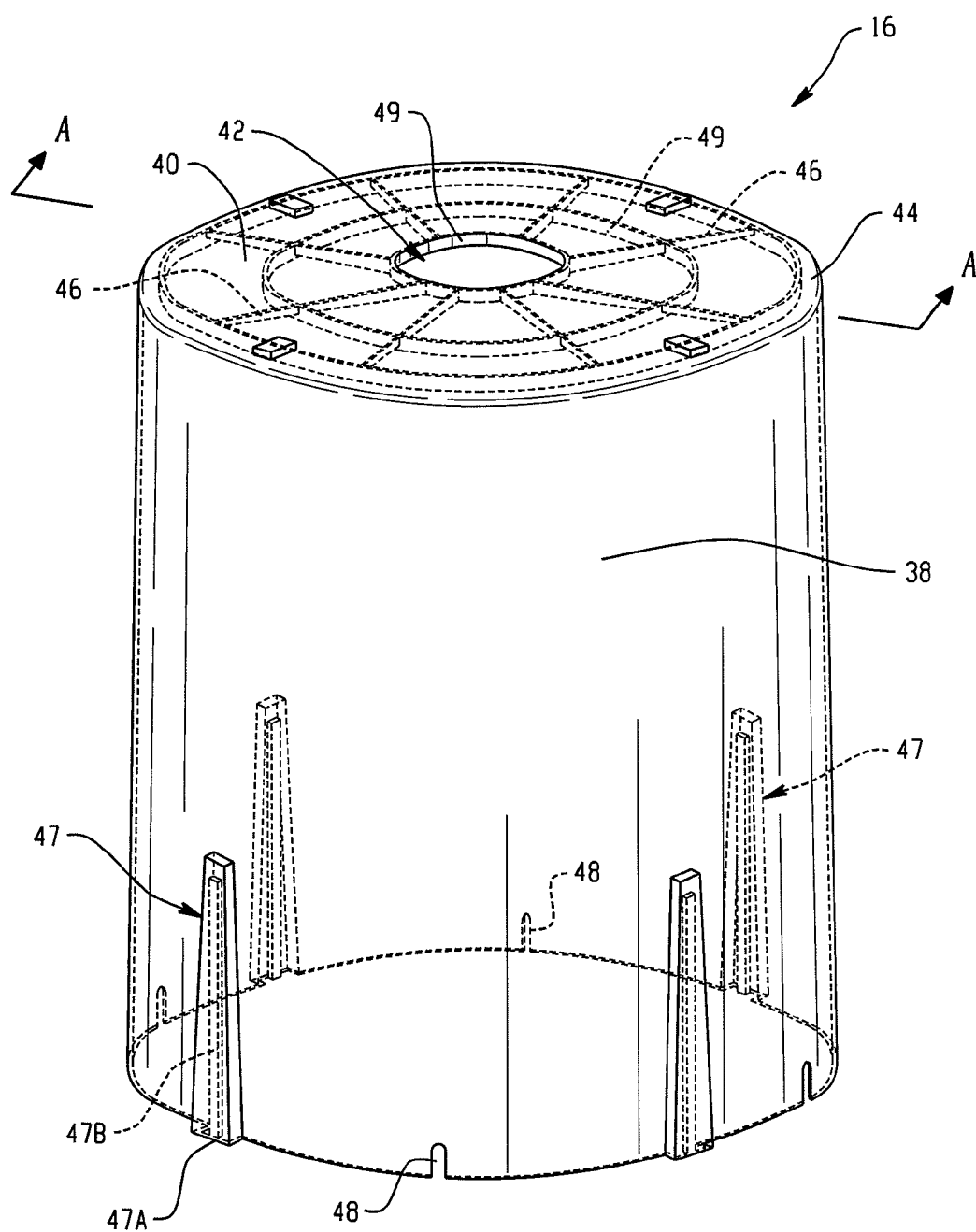
FIG. 3 is a perspective, side view of an embodiment of a hood for use with the filter assembly of FIG. 3.
Figure 3A:
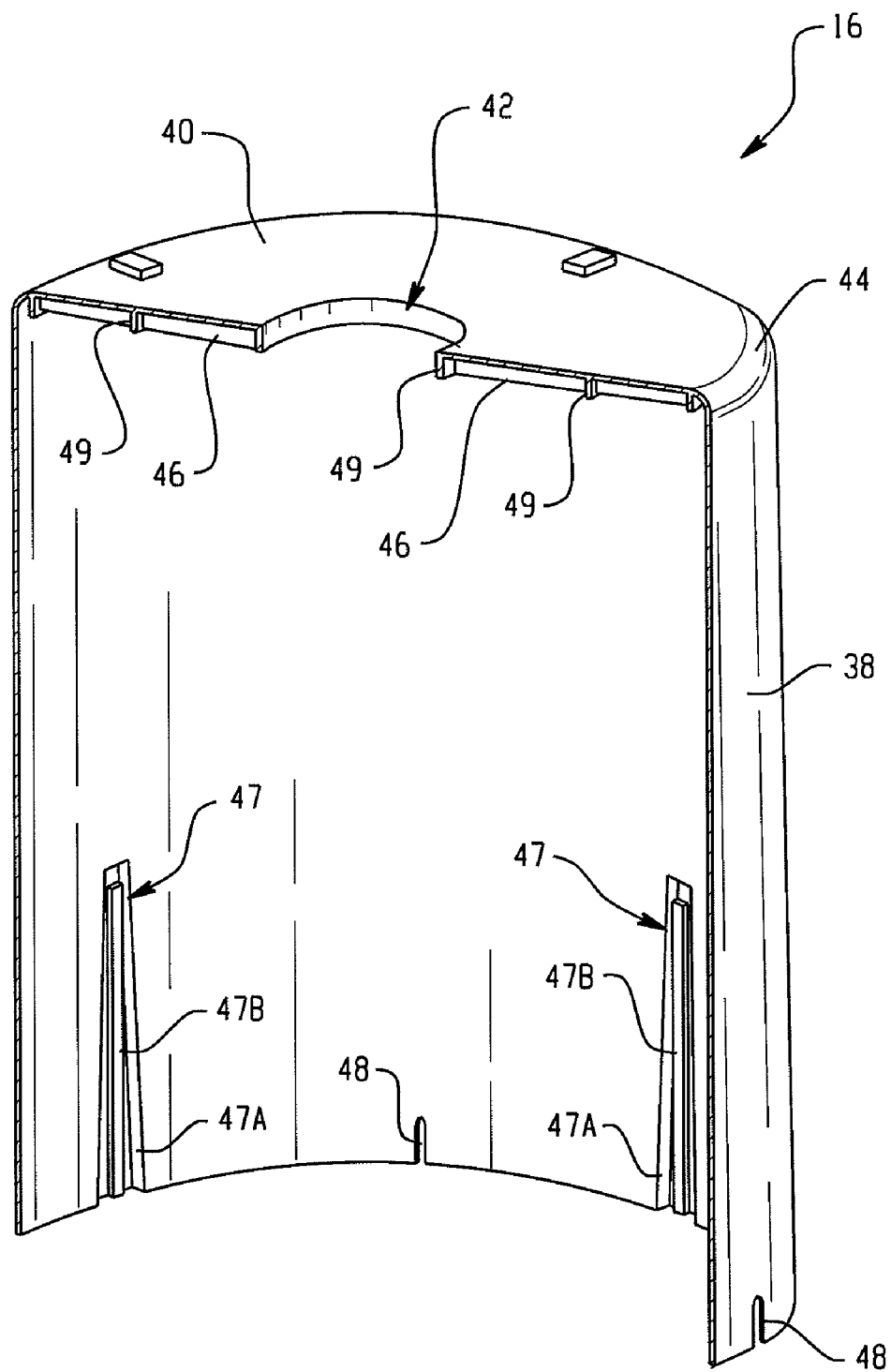
FIG. 3A is a section view along line A-A of FIG. 3.

Turning now to individual components of the filter assembly, FIGS. 3 and 3A show hood 16 in isolation. Hood 16 includes a somewhat cylindrical body 38 (e.g., the diameter of the hood decreasing slightly when moving from the bottom toward the top of the hood) and a frustoconical top 40 (that gradually slopes upward when moving radially inward) having an opening 42 that is sized to allow the upper extending end of the center tube 18 to pass therethrough. Extending radially from a periphery 44 of the frustoconical top 40 to the opening 42 are a series of circumferentially spaced internal ribs 46 that intersect circumferential ribs 49, for providing increased support for the frustoconical top 40. The internal ribs 46 increase in height from the periphery 44 to the opening 42 forming somewhat of a triangle shape. A series of stacking ribs 47 extend radially outwardly from the outer and inner surfaces of the body 38 at the bottom of the hood 16. Specifically, each rib 47 is formed by an outward step 47A in the housing, with an internal strut 47B. The stacking ribs 47 maintain some spacing between stacked hoods 16. The internal struts 47B of an upper hood rest on the outward steps 47A of same underlying hood. Located between the stacking ribs 47 are slots 48 that extend to the bottom of the hood 16.

Figure 4:
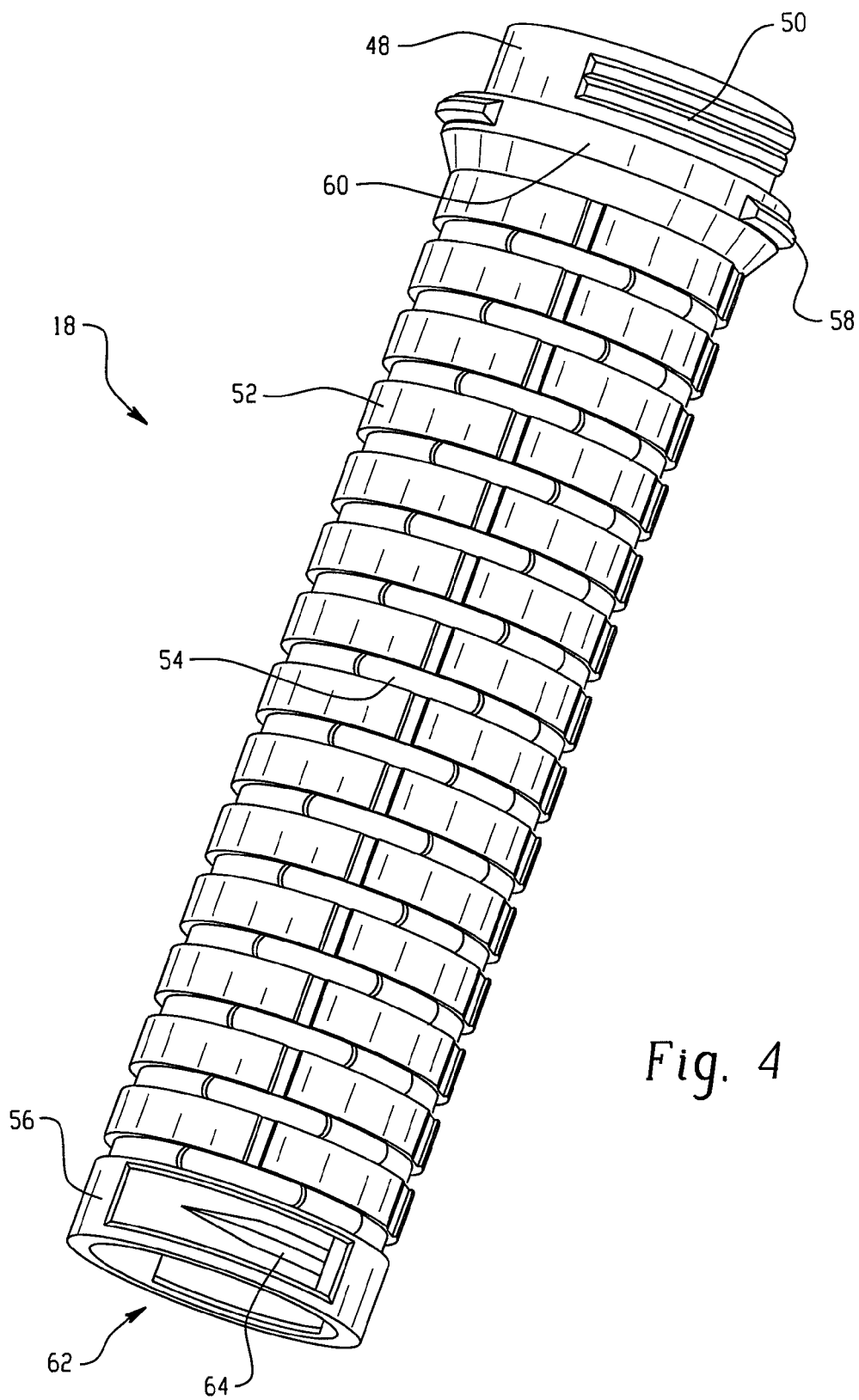
FIG. 4 is a side, section view of an embodiment of a center tube for use with the filter assembly of FIG. 2.
Figure 5:
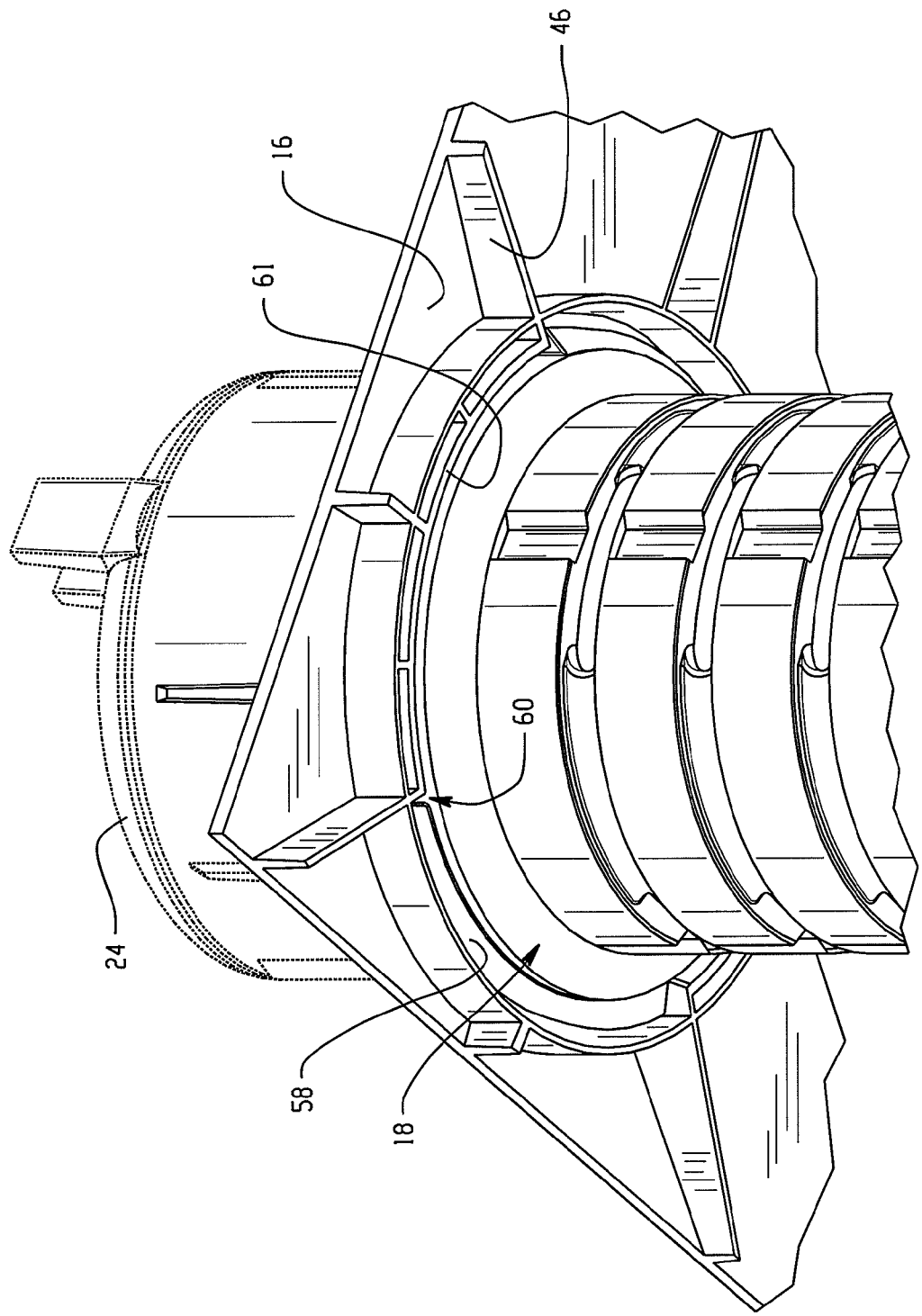
FIG. 5 is a detail view of an interlock between the center tube of FIG. 4 and hood of FIG. 3.

Referring to FIG. 4, center tube 18 includes the upper extending end 48 including a threaded region 50, for example, of coarse double threads, a perforated center section 52 including multiple openings 54 and a bottom section 56. Threaded region 50 mates with inner drainage space cap 24, described later. Below the threaded region 50 are sloped tabs 58 and a space 60 between the tabs for use in self-setting the hood 16 and locking the hood in position relative to the center tube 18. The alignment between the hood 16, tabs 58 and space 60 can be seen in FIG. 5. As can be seen, extensions 61 of the hood 16 fit in the space 60 thereby aligning the hood. Referring again to FIG. 4, a locking mechanism 62 is located at the bottom section 56 and is used to lock the center tube 18 to the bottom 22 using a cantilevered, elastically deflectable tab 64.

Figure 6:
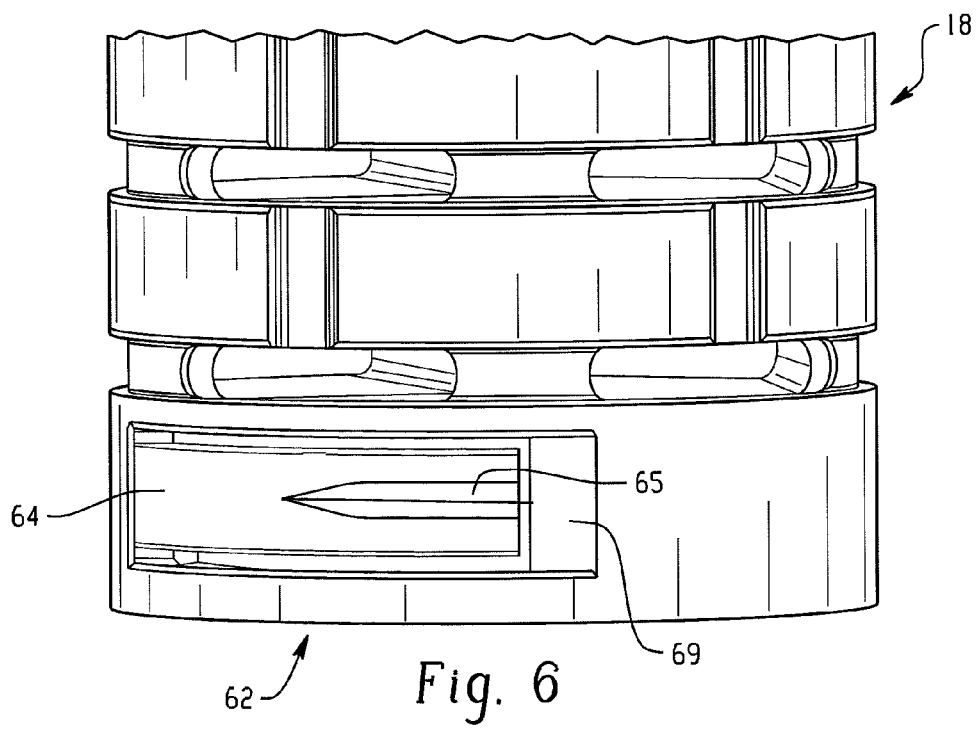
FIGS. 6 and 7 are detail views of an embodiment of locking structure of the center tube of FIG. 4 for use in connecting the center tube to a bottom.
Figure 7:
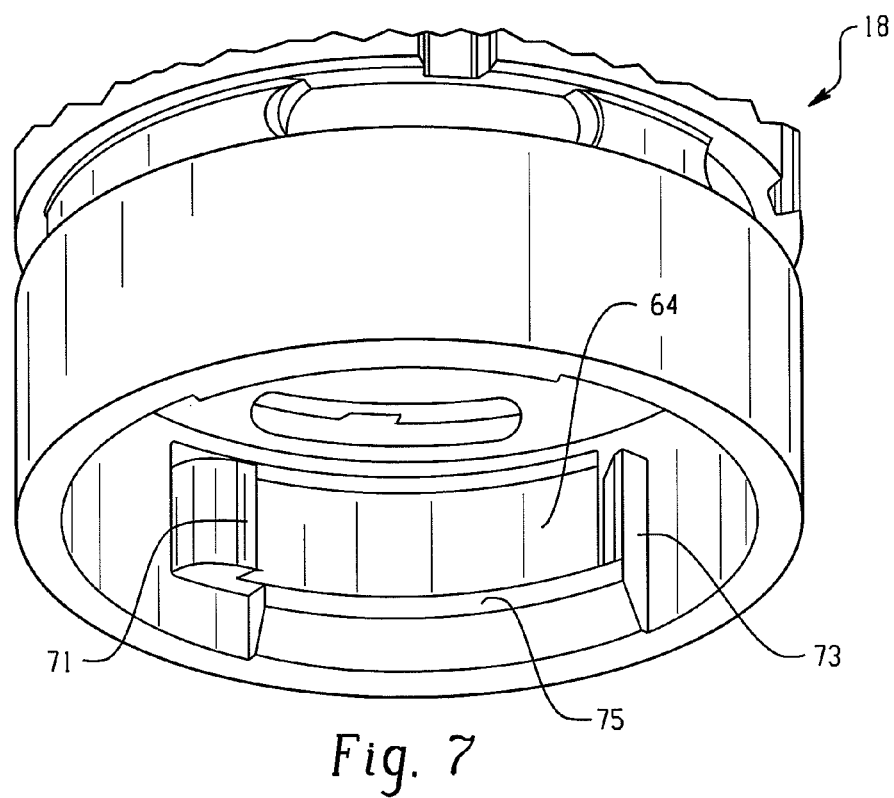

Referring now to FIG. 6, the locking mechanism 62 includes the tab 64, which includes an outer raised rib 65 to provide added strength as well as a finger hold and a slot 69 for insertion of a tool, if required, for disconnecting the center tube 18 from the bottom 22. Referring to FIG. 7, the tab 64 further includes an inward extending hook 71 (or other suitable structure) that interlocks with the bottom 22 and a positive stop 73 that inhibits over rotation of the center tube 18 when connecting to the bottom. A lower protrusion 75 interlocks with the bottom 22 to inhibit vertical movement of the center tube relative to the bottom. Additional details of the connection between the center tube 18 and bottom 22 will be described below.

Figure 8:
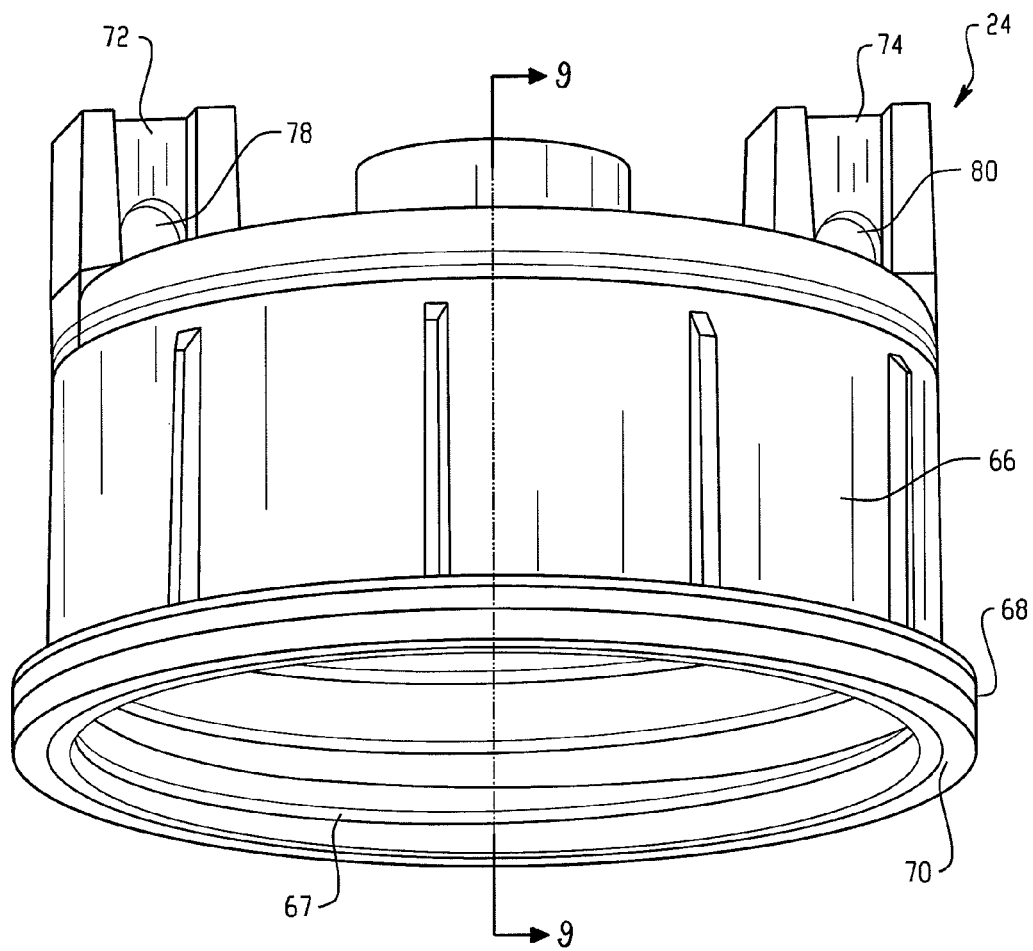
FIG. 8 is a side view of an embodiment of an inner drainage space cap for use with the filter assembly of FIG. 2.

Referring now to FIG. 8, the inner drainage space cap 24 includes a cap body 66 having a threaded inner surface 67, for example, of coarse double threads to mate with the threaded region 50 of the center tube 18 (FIG. 4). A rim 68 extends radially outward from the cap body 66 and includes a gasket 70 located at a lower portion of the rim. In some embodiments, an outer diameter of the rim 68 may be about 5.35 inches. The gasket 70 may be formed of a different material (e.g., a thermoplastic rubber) than the cap body 66 (e.g., acrylonitrile butadiene styrene). In some embodiments, the gasket 70 is co-molded onto the inner drainage space cap 24, for example, using a two-shot injection molding process. The gasket 70 is used to form an air-tight seal between the inner drainage space cap 24 and hood 16. The cap 24 also compresses the frustoconical hood top 40 by deflecting it, which prestresses the hood to resist lift caused by trapped air and/or buoyant media. A pair of lifting structures 72 and 74 are located on opposite sides of a valve mechanism 76. The lifting structures have respective openings 78 and 80 that can be used to lift and transport the filter assembly 10, once assembled.

Figure 9:
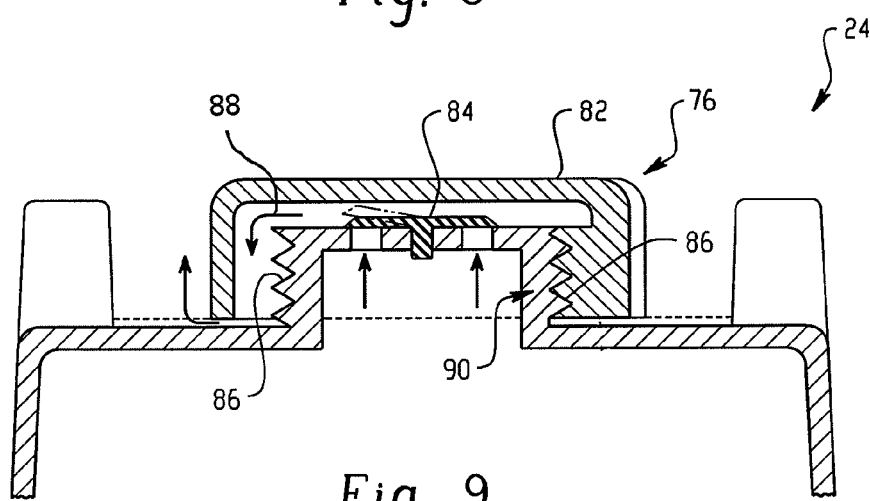
FIG. 9 is a section view of the inner drainage space cap along line 9-9 of FIG. 8.

Referring to FIG. 9, the valve mechanism 76 includes a check valve cap 82 that surrounds and protects a check valve 84 from stormwater. Check valve 84 is located at a top of the inner drainage space cap 24, and engages a threaded portion 86 of the inner drainage space cap. The check valve cap 82 includes one or more channels 88 formed on the interior surface of the cap. Channels 88 permit the air escaping from beneath the filter hood via the check valve to escape from beneath cap 82, as indicated by the arrows in FIG. 9. The inner surface of the check valve cap 82 also includes threaded regions 90 that are complementary to threaded portion 86 and that secure the check valve cap to the inner drainage space cap. Channels 88 in the check valve cap are configured so that even when the check valve cap is tightly engaged to the inner drainage space cap, the channels are unobstructed. The cap 82 is configured to maintain an air space above the valve 84 even when the filter assembly is completely submerged.

Figure 10:
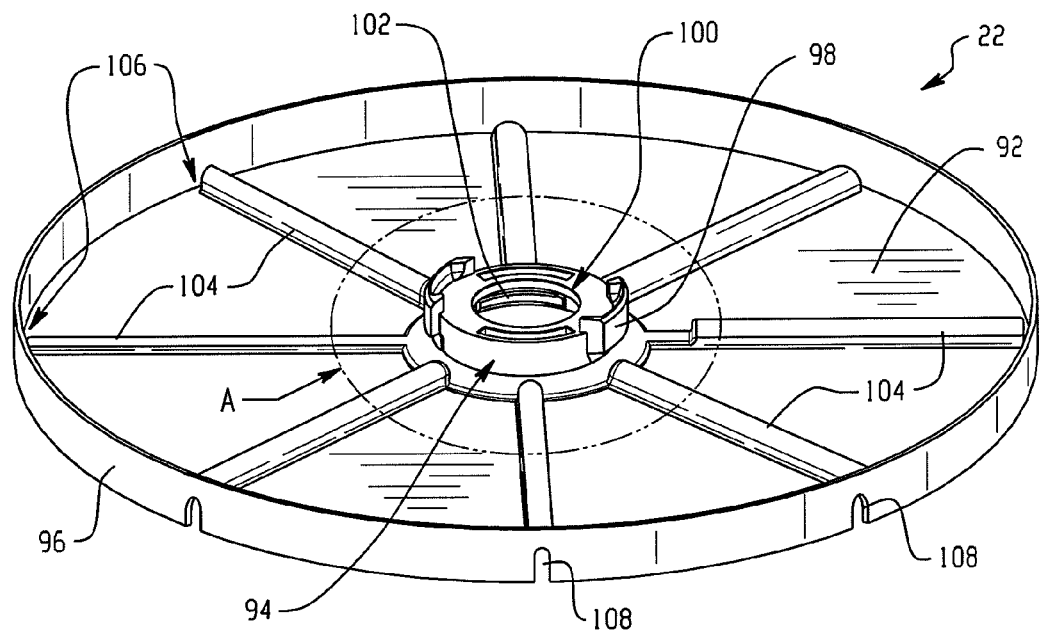
FIG. 10 is a top view of an embodiment of a bottom for use with the filter assembly of FIG. 2.
Figure 11:
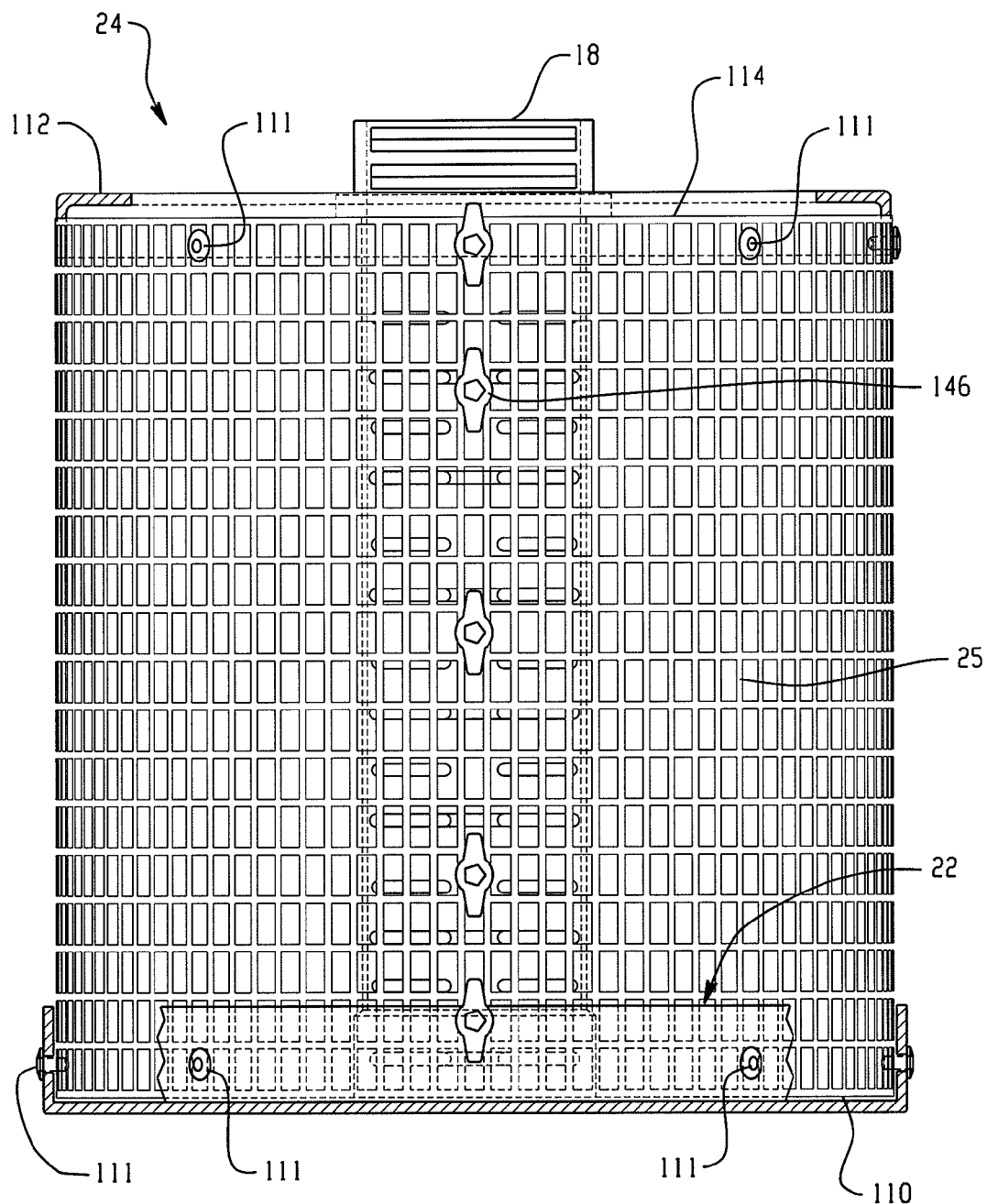
FIG. 11 is a side view of an embodiment of an outer screen for use with the filter assembly of FIG. 2 connected to the bottom of FIG. 10 and a top ring.

Referring to FIG. 10, bottom 22 (e.g., in the form of a pan) includes a substantially planar floor 92, a central boss 94 and an outer peripheral wall 96 that extends upward from the floor 92. As can be seen by FIG. 10, a series of ribs 104 extend in a radial direction between the boss 94 and the peripheral wall 96. The ribs 104 stop short of the peripheral wall 96 forming a gap 106 therebetween. These gaps 106 are each sized to receive a bottom edge 110 of the outer screen 25 (FIG. 11). The gaps 106 and peripheral wall 96 help to self-align and position the outer screen 25 during installation.

Located adjacent the radially outer end of each rib 104 (or adjacent at least some of the ribs 104) are openings 108. The openings 108 extend through the peripheral wall 96 and are aligned with the ribs 104. The openings 108 are sized and located to receive self-tapping screws 111 (or other suitable fastener) after the outer screen 25 is positioned within the gaps 106 (see also FIG. 11). The screws 111 are tapped into the ends of ribs 104 for securing the bottom 22 to the outer screen 25.

Figure 10A:
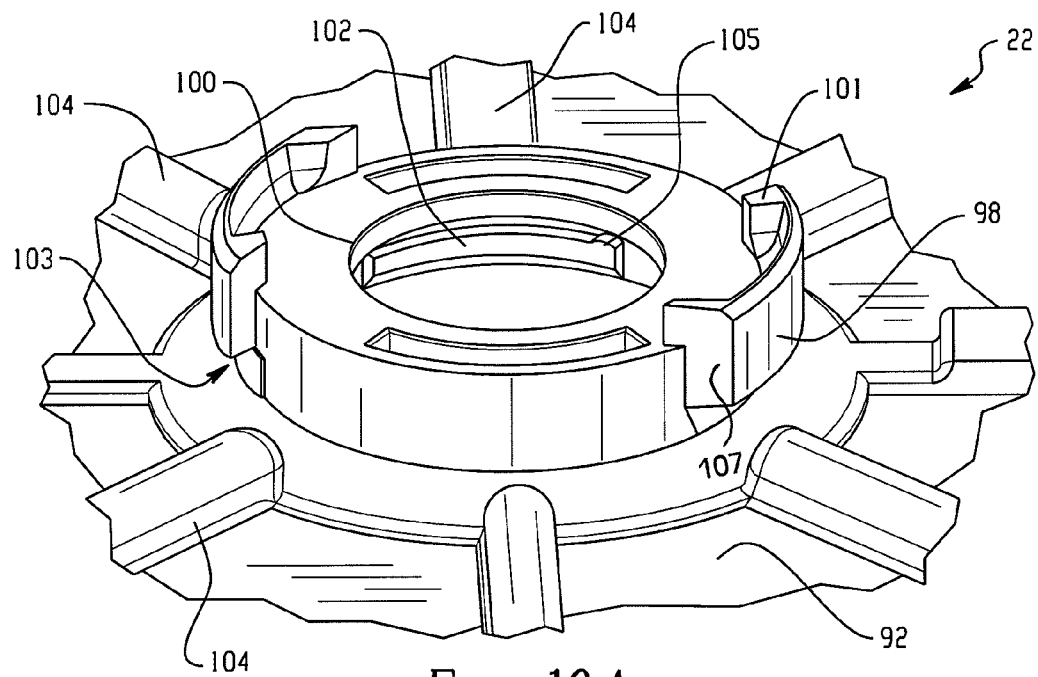
FIG. 10A is a detail view of area A of FIG. 10.
Figure 12:
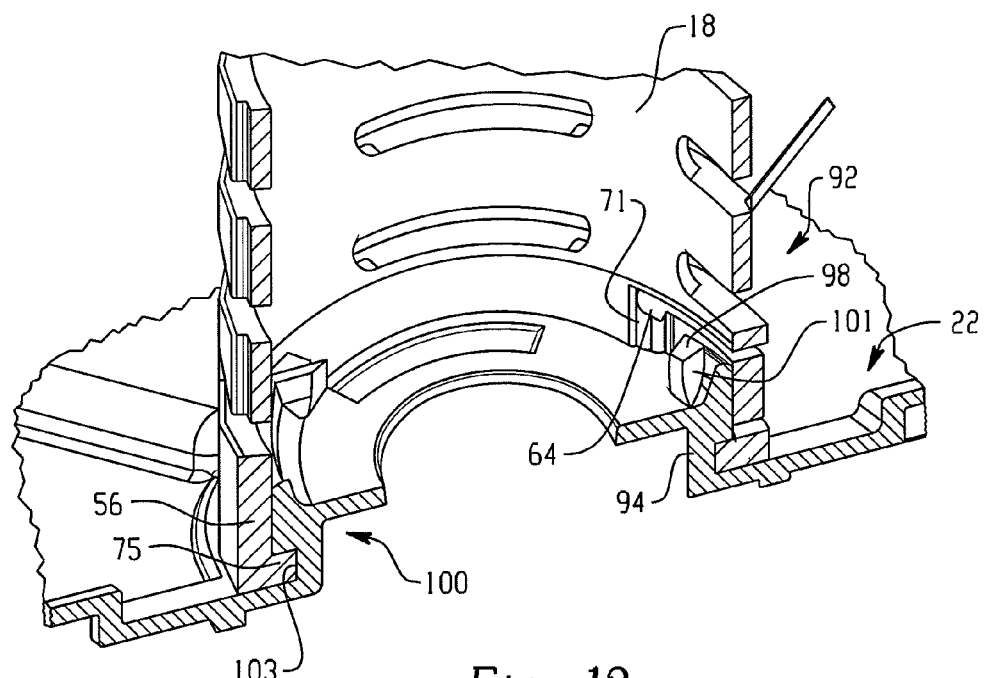
FIG. 12 is a section view detailing a connection between the center tube of FIG. 4 and the bottom of FIG. 10.

Referring to FIG. 10A, boss 94, which may be formed unitary with the floor 92, is sized and shaped to fit within bottom section 56 of center tube 18. Referring also to FIG. 12, the boss 94 includes a tab 98 that mates with the tab 64 of the center tube 18. In particular, tab 98 includes a protrusion 101 that can engage hook 71 of tab 64 to secure the center tube to the bottom 22 and to prevent relative rotation therebetween. A space 103 between a bottom of the boss and the tab 98 is sized and located to receive the lower protrusion 75 to inhibit vertical movement of the center tube 18 relative to the bottom 22. Boss 94 further includes an opening 100 that is sized to receive a conduit connection, sometimes referred to as a deck stub, described below. The boss 94 has internal ribs 102 with an enlarged locking portion 105 that mate with the deck stub to secure the bottom to the deck stub during installation. This also provides positive feedback that the filter is properly installed.

To connect the center tube 18 to the bottom 22, the tube tabs 64 are aligned to spaces between the boss tabs 98 and the center tube 18 is fitted onto the boss 94. When the center tube 18 bottoms out on the bottom 22, the center tube is rotated so that an end 107 of tab 98 (i.e., the end opposite the protrusion 101) slides over the curved surface of the hook 71 causing the tube tab 64 to deflect outwardly until the protrusion 101 moves past the hook and the tube tab snaps back radially inwardly. This may be a 90 degree rotation of the center tube 18. At this point, stop 73 prevents rotation of the center tube 18 relative to the bottom 22 in one direction by engaging end 107 of the tab 98, and hook 71 prevents rotation of the center tube in the opposite direction because the angled surface of protrusion 101 will move into the slot of the hook 71, preventing the tube tab 64 from deflecting radially outward.

Figure 13:
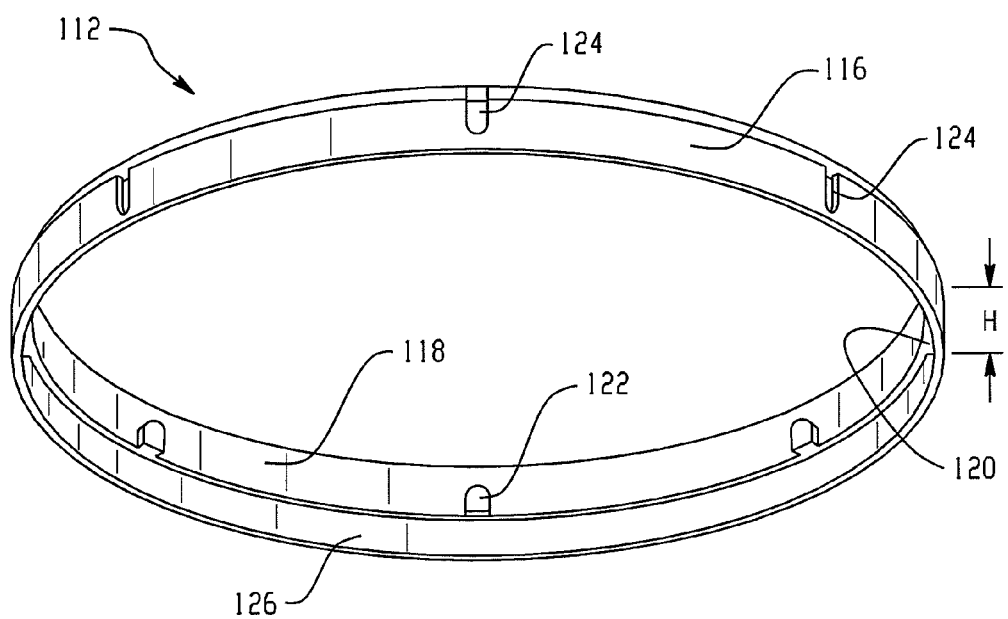
FIG. 13 is a perspective, side view of an embodiment of a top ring for use with the filter assembly of FIG. 2.

Referring now to FIG. 13, a top ring 112 is used to secure an upper edge 114 of the outer screen 25 (FIG. 11). The top ring 112 is of a concentric dual-ring construction and includes an outer ring 116 and an inner ring 118 spaced radially from the outer ring, forming a groove 126 therebetween that is sized to receive the upper edge 114 of the screen. In some embodiments, the outer ring 116 has an axial height H that is greater than that of the inner ring 118, which can aid in assembly. Inner ring 118 includes both internal and external ribs 120, 122 that are aligned with openings 124 extending through the outer ring 116. The openings 124 are sized and positioned to receive self-tapping screws 111 (or other suitable fastener) after the upper edge 114 is located within the groove 126. The screws 111 are tapped into the ribs 120, 122 for securing the top ring 112 to the outer screen 25 (FIG. 11).

Figure 14:
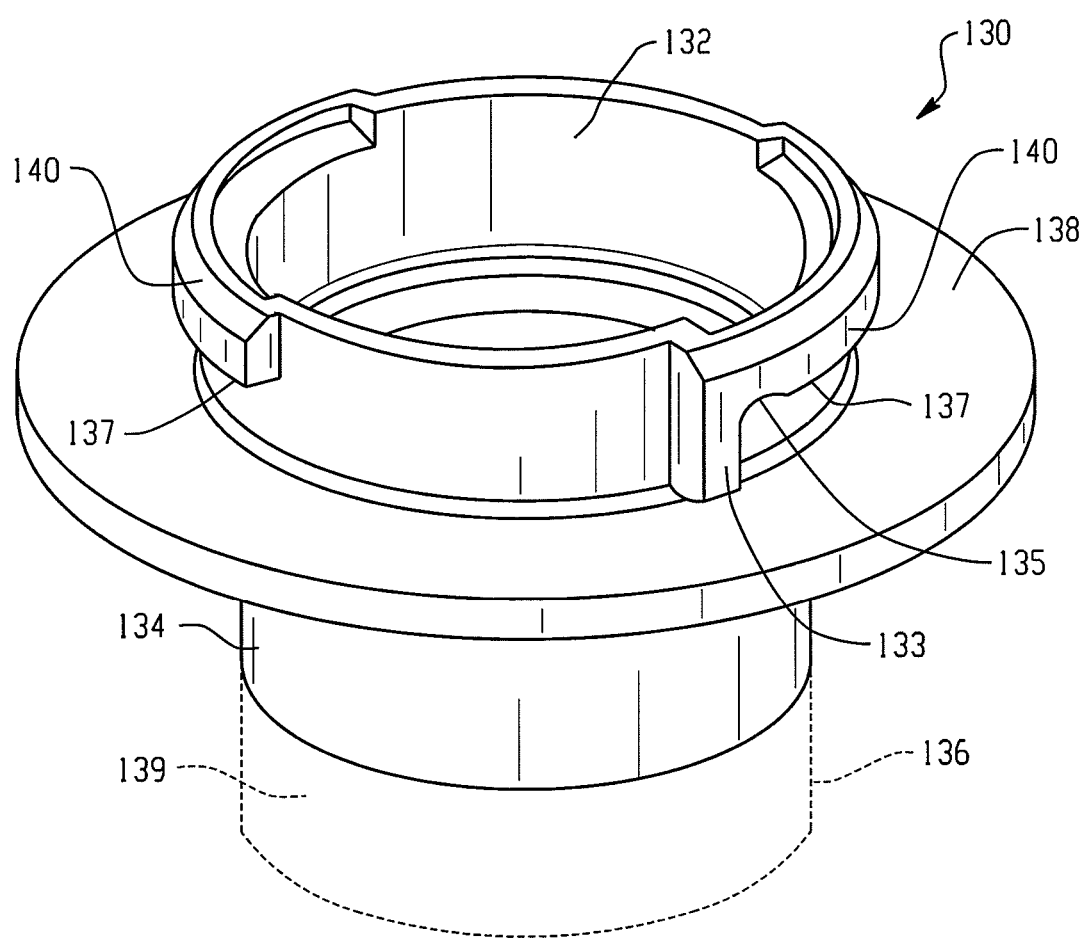
FIG. 14 is a perspective, top view of an embodiment of a deck stub for use with the filter assembly of FIG. 2.

FIG. 14 shows deck stub 130, which includes an upper portion 132 that connects to the bottom 22 and a lower portion 134 that connects to a drain conduit 136 (illustrated by dotted lines), for example, using ABS glue. In some embodiments, a deck stub mount 139 is located between the deck stub 130 and the drain conduit 136. A rim 138 extending radially outwardly from the deck stub 130 is used to mate with and support the bottom 22, forming a fluid-tight seal therebetween. Upper portion 132 includes locking structure 140 forming a groove 137 that mates with ribs 102 of the bottom 22 to lock the bottom to the deck stub 130 during installation and inhibit movement (vertical and rotational) of the cartridge assembly 10. Positive stop portion 133 of the locking structure prevents over-rotation of the bottom 22 when connecting the bottom to the deck stub 130 and locking portion 135 mates with locking portion 105 of the boss 94.

To connect the bottom 22 to the deck stub 130, the ribs 102 are aligned with the spaces between the deck stub locking structure 140 and the bottom is rotated (e.g., about 90 degrees by applying a rotational force to the hood 16 once the filter assembly is assembled) so that the lock portion 105 of the boss 94 moves into the groove 137 until it reaches locking portion 135 providing a detent feature to hold the assembly in place. In some embodiments, the rib 102 deflects while the portion 105 is within groove 137 and then snaps back once the portion 105 is within the locking portion 135.

Figure 15A:
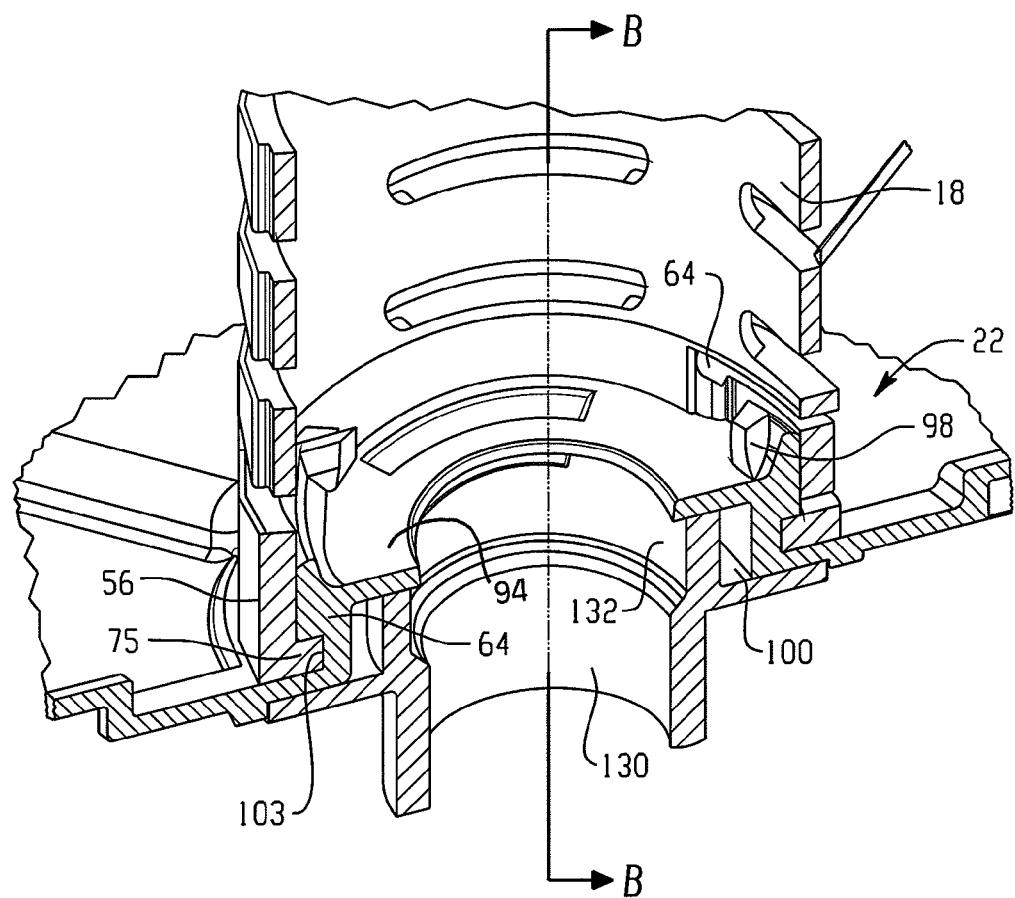
FIG. 15A is a section view detailing a connection between the center tube of FIG. 4, the bottom of FIG. 10 and the deck stub of FIG. 14.
Figure 15B:
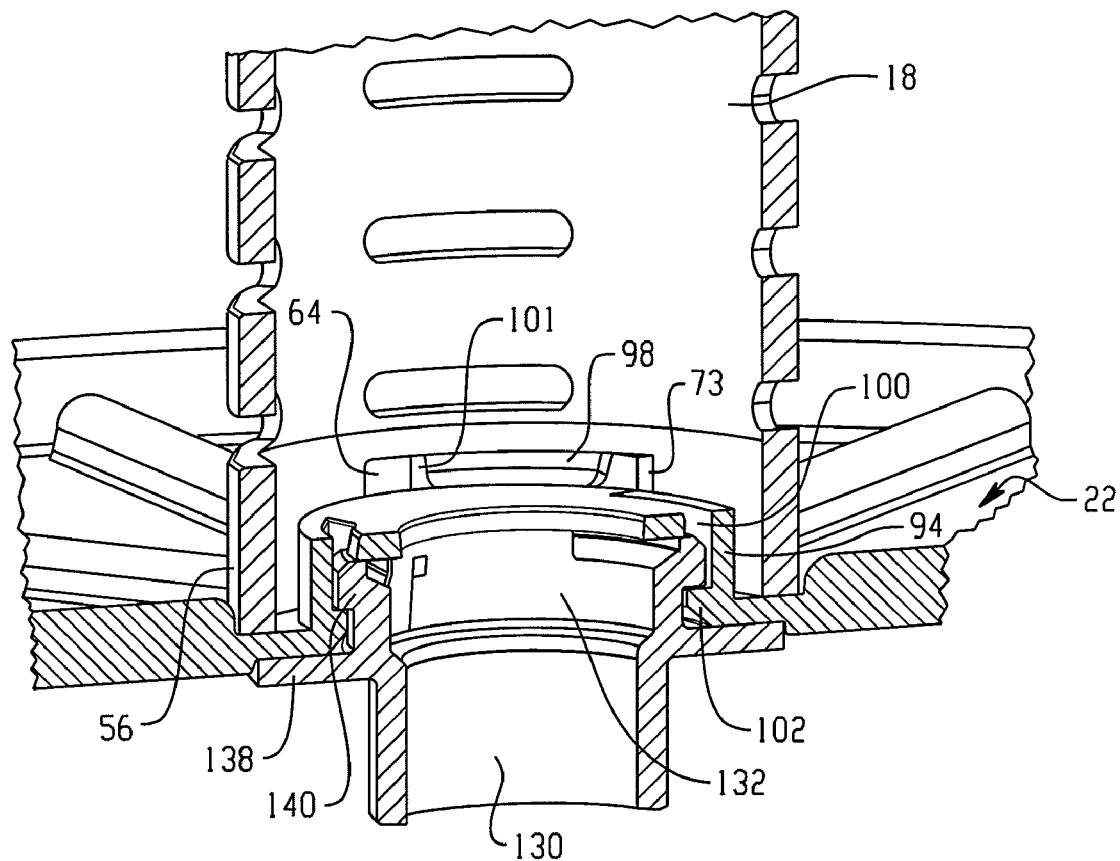
FIG. 15B is a section view detailing the connection between the center tube of FIG. 4, the bottom of FIG. 10 and the deck stub of FIG. 14 along line B-B of FIG. 15A.

FIGS. 15A and 15B illustrate the center tube 18, bottom 22 and deck stub 130 interconnected. As described above, the boss 94 is received within the bottom section 56 of center tube 18 and the upper portion 132 of the deck stub 130 is received within the opening 100 of the boss. The tab 98 of the boss is interlocked with the snap lock which includes tab 64 of the center tube 18 and the lower protrusion 75 is mated within the groove 103 (FIG. 15A). Deck stub 130 is interlocked with the bottom 22 using the rib 102 and locking structure 140, which inhibits both rotational and vertical movement of the bottom relative to the deck stub, except that the filter can be removed from the stub by rotating to overcome the detent force between portions 105 and 135.

Figure 16:
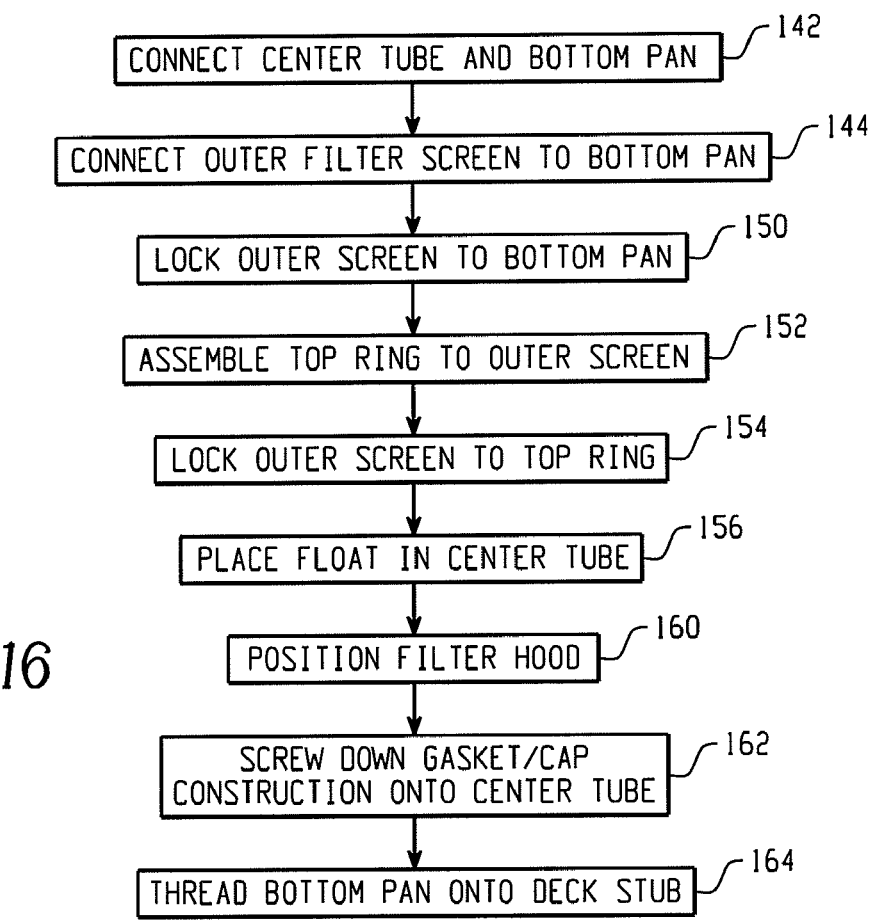
FIG. 16 illustrates an embodiment of a method of assembling and installing the cartridge assembly of FIG. 2.
Figure 17:
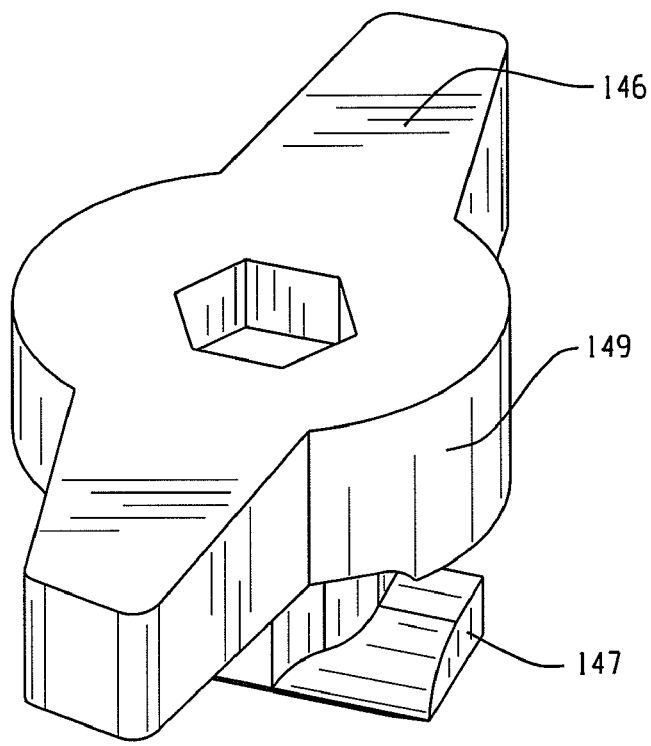
FIG. 17 is a perspective view of an embodiment of a clip for use in securing the outer screen of FIG. 11 to itself.

FIG. 16 illustrates a process for assembling and installing the cartridge assembly 10. At step 142, the center tube 18 is connected to the bottom 22 using the locking mechanism 62 of the center tube including the elastically deflectable tab 64 and tab 98 with protrusion 101 and ribs 102 of the bottom. The outer screen 25 is then placed on the bottom 22, within the grooves 106 and around the center tube 18 at step 144. The outer screen 25 typically overlaps itself and may be secured to itself using clips 146 by inserting a mating part 147 of the clips into the overlapped outer screen and turning the clips (e.g., 90 degrees) using the enlarged wing portion 149 (see FIGS. 11 and 17). At step 150, self-tapping screws are threaded into openings 108, through the outer screen 25 and into the ribs 104 which lock the outer screen 25 to the bottom 22. At step 152, the top ring 112 is assembled to the outer screen 25 by sandwiching an upper end of the outer screen between the inner and outer rings 118 and 116. At step 154, self-tapping screws are threaded into openings 124 in the top ring 112, which lock the outer screen 25 to the top ring. The float 30 is placed within the center tube 18 at step 156 (however, the float may be placed within the center tube 18 prior to or even after this step). Also at step 156, media is added to the filter basket. At step 160, the filter hood 16 is positioned over the outer screen 25 and the top ring 112 with the threaded region 50 exposed through the top opening in the filter hood and the filter hood interlocks with the sloped tabs 58 and a cut in space 60 of the center tube 18. The inner drainage space cap 24 is then threaded onto the center tube 18 thereby applying a downward force on the hood 16 thereby maintaining the interlock between the filter hood and the center tube at step 162. At step 164, the bottom 22 is connected to the deck stub 130 which is already connected to an outlet tube, for example, within a stormwater basin. As can be appreciated, with the hood 16 fixedly connected to the center tube 18, the center tube locked to the bottom 22 and the bottom fixedly connected to the outer screen 25, the cartridge assembly 10 can be rotated as a unit, e.g., by applying a rotational force to the hood when threading the assembly onto (or off of) the deck stub 130.

It is to be clearly understood that the above description is intended by way of illustration and example only and is not intended to be taken by way of limitation, and that changes and modifications are possible. Accordingly, other embodiments are contemplated and modifications and changes could be made without departing from the scope of this application as expressed by any claims now included or hereafter added.

What is claimed is:

1. A filter assembly for use in filtering stormwater, comprising:
    a bottom member including a boss that includes a rib extending circumferentially along an inner surface of the boss, the rib including a locking portion extending upwardly from the rib and that mates with a corresponding locking portion on a peripheral surface of a connection to an outlet conduit for securing the bottom to the connection thereby inhibiting rotation of the bottom member relative to the outlet conduit, the boss including an outer tab that is raised to define a space between a bottom of the boss and the tab;
    a center tube secured to the bottom member using a locking mechanism that inhibits relative movement between the bottom member and the center tube, the locking mechanism including a tab with an inwardly projecting hook, the tab capable of flexing during interaction with the outer tab of the bottom member, the center tube including an inwardly projecting protrusion below the tab and located within the space to inhibit vertical movement of the center tube relative to the bottom member, the center tube being in communication with an opening in the bottom;
    a hood secured to the center tube; and
    a filter medium located between the hood and the center tube.

2. The filter assembly of claim 1, wherein the hood and center tube include corresponding interlocking structure that inhibit rotation of the hood relative to the center tube with the hood secured to the center tube.

3. The filter assembly of claim 1 further comprising an outer screen secured to the bottom member at a bottom portion of the outer screen to inhibit relative movement between the outer screen and the bottom.

4. The filter assembly of claim 3, wherein the outer screen is secured to the bottom member using a fastener that is inserted through a peripheral wall of the bottom member, through the outer screen and into a radial rib of the bottom member.

5. The filter assembly of claim 1 further comprising a top ring that receives an upper edge of an outer screen within a groove, the outer screen located between the hood and the filter medium.

6. The filter assembly of claim 5, wherein the top ring is secured to the outer screen with a fastener inserted through an outer portion of the top ring, through the outer screen and into an inner portion of the top ring.

7. The filter assembly of claim 1 further comprising an inner drainage space cap that is connected to an upper extending end of the center tube that extends beyond an opening in the hood.

8. The filter assembly of claim 7, wherein the inner drainage space cap includes a gasket, the gasket engaging the hood forming an air-tight seal therebetween.

9. The filter assembly of claim 8, wherein the inner drainage space cap includes a check valve that is configured to permit air to escape but not enter a drainage space within the center tube such that a siphon can be established during operation.

10. The filter assembly of claim 1, wherein a height of the filter media is more than about 20 inches.

11. The filter assembly of claim 1, wherein the hood has a top having a series of ribs extending radially between a periphery of the top and a center of the top.

12. The filter assembly of claim 1, wherein the hood includes ribs extending outwardly from an outer periphery of the hood, the ribs being configured to maintain some spacing between stacked hoods.

13. A method of assembling a filter assembly for use in filtering stormwater and installing the filter assembly, the method comprising:
  securing a center tube to a bottom using a locking mechanism inhibiting relative rotational movement between the bottom and the center tube, the center tube being in communication with an opening in the bottom;
  securing a hood to the center tube inhibiting relative movement between the center tube and the hood;
  providing a filter media between the hood and the center tube; and
  applying a rotational force to the assembly which causes the center tube and bottom to rotate during installation.

14. The method of claim 13 further comprising securing an outer screen to the bottom at a bottom portion of the outer screen to inhibit relative movement between the outer screen and the bottom, the outer screen positioned between the hood and the filter media.

15. The method of claim 14, wherein the step of securing the outer screen to the bottom comprises inserting a fastener through a peripheral wall of the bottom, through the outer screen and into a radial rib of the bottom.

16. The method of claim 15, wherein the step of locating the outer screen on the bottom comprises positioning the bottom portion of the outer screen within a gap formed between the radially extending rib and the peripheral outer wall.

17. The method of claim 14 further comprising placing an upper edge of the outer screen within a top ring having a groove sized to receive the upper edge of the outer screen.

18. The method of claim 17 further comprising securing the outer screen to the top ring by inserting a fastener through an outer portion of the top ring, through the outer screen and into an inner portion of the top ring.

19. The method of claim 14 further comprising connecting an inner drainage space cap onto an upper extending end of the center tube that extends beyond an opening in the hood, the inner drainage space cap including a rim having a gasket, the gasket engaging the hood forming an air-tight seal therebetween.

20. The method of claim 19, wherein the inner drainage space cap includes a check valve that is configured to permit air to escape but not enter a drainage space within the center tube such that a siphon can be established during operation.

21. The method of claim 13 further comprising securing the bottom onto an outlet conduit connection by rotating the hood, center tube and bottom together, the bottom including a boss that includes a tab portion that mates with a corresponding recess portion on a peripheral surface of the outlet conduit connection for securing the bottom to the outlet conduit connection thereby inhibiting rotation of the bottom relative to the outlet conduit connection and providing positive feedback that the bottom is secured to the outlet conduit connection.

22. A stormwater treatment system for use in filtering stormwater, comprising:
  an outlet conduit connection that connects to a filter conduit for use in delivering filtered stormwater toward an outlet of the stormwater treatment system, the outlet conduit connection comprising a locking portion on an outer peripheral surface of the outlet conduit connection; and
  a filter assembly comprising
    a bottom including a boss that includes a rib extending laterally along an inner surface of the boss, the rib including a locking portion that mates with the locking portion on the peripheral surface of the outlet conduit connection for securing the bottom to the outlet conduit connection thereby inhibiting rotation of the bottom relative to the outlet conduit connection;
    a center tube secured to the bottom using a locking mechanism that inhibits relative movement between the bottom and the center tube, the center tube being in communication with an opening in the bottom and the outlet conduit connection;
    a hood secured to the center tube; and
    a filter media between the hood and the center tube.

23. The stormwater treatment system of claim 22, wherein the outlet conduit connection includes an outwardly extend rib that mates with a bottom of the bottom.

24. The stormwater treatment system of claim 22 further comprising a outlet conduit connection mount located between the outlet conduit connection and filter conduit.

25. A filter assembly for use in filtering stormwater, comprising:
  a housing structure;
  a drainage space within the housing structure; and
  a filter medium between the drainage space and housing structure;
  wherein the housing structure includes a lower portion with a mount opening for mating with an outlet conduit connection, the mount opening including a pair of circumferentially extending and diametrically opposed ribs extending radially inwardly;
  wherein each rib includes a locking tab at one end thereof, the locking tab formed by a raised protrusion of the upper surface of the rib.

* * * * *